US009660743B1

United States Patent
Ashkenazi et al.

(10) Patent No.: US 9,660,743 B1
(45) Date of Patent: May 23, 2017

(54) CHANNEL ESTIMATION BY SEARCHING OVER CHANNEL RESPONSE CANDIDATES HAVING DOMINANT COMPONENTS

(71) Applicant: Marvell International Ltd., Hamilton (BM)

(72) Inventors: Rony Ashkenazi, Moshav Kidron (IL); Daniel Yellin, Ra'anana (IL); Shimon Moshavi, Bet Shemesh (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/836,973

(22) Filed: Aug. 27, 2015

Related U.S. Application Data (60) Provisional application No. 62/042,603, filed on Aug. 27, 2014.

(51) Int. Cl.
*H04L 27/06* (2006.01)
*H04B 7/216* (2006.01)
(Continued)

(52) U.S. Cl.
CPC ............ *H04B 17/364* (2015.01); *H04B 1/69* (2013.01); *H04W 24/02* (2013.01); *H04L 5/0053* (2013.01)

(58) Field of Classification Search
CPC ... H04L 1/0071; H04L 5/0053; H04L 1/1861; H04L 1/0025; H04L 1/0027; H04L 1/0643
(Continued)

(56) References Cited

U.S. PATENT DOCUMENTS 5,568,558 A 10/1996 Ramm et al.
5,572,552 A 11/1996 Dent et al.
(Continued)

FOREIGN PATENT DOCUMENTS

EP 0721264 A 7/1996
WO 9818210 A 4/1998
(Continued)

OTHER PUBLICATIONS

3GPP TR 25.848, 3rd Generation Partnership Project; Technical Specification Group Radio Access Network; Physical layer aspects of UTRA High Speed Downlink Packet Access (Release 4), version 4.0.0, 89 pages, Mar. 2001.
(Continued)

*Primary Examiner* — Daniel Washburn
*Assistant Examiner* — Sarah Hassan (57) ABSTRACT

A method in a receiver includes receiving a signal that traversed a multipath channel having a channel response, so as to produce a received sequence of samples that are indicative of the channel response. Using a predefined similarity measure, multiple metrics between the received sequence of samples and multiple respective candidate sequences of samples are calculated by the receiver. Each candidate sequence includes a combination of one or more dominant signal components having respective sample delays, and each candidate sequence corresponds to a channel multipath candidate that has one or more channel paths at the respective sample delays. The channel response is estimated by the receiver, by selecting the candidate sequence that best matches the received sequence, the selecting being based on the similarity measure.

22 Claims, 3 Drawing Sheets

(51) Int. Cl.
*H04B 17/364* (2015.01)
*H04B 1/69* (2011.01)
*H04W 24/02* (2009.01)
*H04L 5/00* (2006.01)

(58) Field of Classification Search
USPC .......................................... 375/340; 370/335
See application file for complete search history.

(56) References Cited

U.S. PATENT DOCUMENTS

| | | | |
|---|---|---|---|
| 5,687,162 A | | 11/1997 | Yoshida et al. |
| 5,742,678 A | * | 4/1998 | Dent ...................... H04B 1/707 370/335 |
| 5,937,014 A | * | 8/1999 | Pelin ..................... H04B 1/707 375/340 |
| 6,028,853 A | * | 2/2000 | Haartsen .............. H04B 7/2687 370/338 |
| 6,034,986 A | | 3/2000 | Yellin et al. |
| 6,151,358 A | | 11/2000 | Lee et al. |
| 6,388,618 B1 | * | 5/2002 | Stilp ........................ G01S 5/02 342/457 |
| 6,879,623 B2 | | 4/2005 | Agami et al. |
| 7,042,926 B2 | | 5/2006 | Yellin et al. |
| 7,058,116 B2 | | 6/2006 | Moshavi et al. |
| 7,139,592 B2 | | 11/2006 | Leifer et al. |
| 7,173,966 B2 | * | 2/2007 | Miller ..................... H04K 1/00 375/229 |
| 7,957,485 B2 | | 6/2011 | Cairns et al. |
| 8,098,717 B1 | | 1/2012 | Griniasty |
| 8,175,135 B1 | | 5/2012 | Griniasty |
| 8,351,487 B1 | | 1/2013 | Griniasty |
| 2001/0022558 A1 | * | 9/2001 | Karr, Jr. ................. G01S 1/026 342/450 |
| 2002/0015401 A1 | * | 2/2002 | Subramanian ........ H04L 1/0052 370/347 |
| 2002/0136158 A1 | | 9/2002 | Frank |
| 2003/0022636 A1 | | 1/2003 | Ylitalo et al. |
| 2003/0081701 A1 | | 5/2003 | Pick et al. |
| 2003/0095588 A1 | | 5/2003 | Yellin et al. |
| 2003/0133424 A1 | * | 7/2003 | Liang .................. H04B 1/7113 370/335 |
| 2003/0142732 A1 | | 7/2003 | Moshavi et al. |
| 2004/0017867 A1 | | 1/2004 | Thomas et al. |
| 2004/0042532 A1 | | 3/2004 | Artamo et al. |
| 2004/0078403 A1 | * | 4/2004 | Scheuermann .... H03H 21/0012 708/322 |
| 2004/0125898 A1 | | 7/2004 | Ariyavisitakul et al. |
| 2004/0136444 A1 | | 7/2004 | Massicotte et al. |
| 2004/0141548 A1 | | 7/2004 | Shattil |
| 2004/0174939 A1 | | 9/2004 | Wang |
| 2005/0053121 A1 | * | 3/2005 | Lakkis ..................... H04L 1/06 375/130 |
| 2005/0094713 A1 | | 5/2005 | Yellin |
| 2006/0212194 A1 | * | 9/2006 | Breed ..................... G07C 5/008 701/1 |
| 2007/0117527 A1 | | 5/2007 | Xu et al. |
| 2010/0124895 A1 | | 5/2010 | Martin et al. |
| 2011/0287778 A1 | * | 11/2011 | Levin .................... G01S 5/0252 455/456.1 |

FOREIGN PATENT DOCUMENTS

| | | |
|---|---|---|
| WO | 0122609 A1 | 3/2001 |
| WO | 2005046075 A1 | 5/2005 |
| WO | 2009025611 A2 | 2/2009 |

OTHER PUBLICATIONS

Motorola, "Revised HSDPA UE Performance Requirements," TSG-RAN Working Group 4, Meeting #21, 11 pages, Jan. 28-Feb. 1, 2002.
Ericsson, "Comments on the CPICH Interference Cancellation Scheme," TSG-RAN Working Group 4 (Radio), Meeting #20, 4 pages, Nov. 12-16, 2001.
Verdu, S. "Multiuser Detection", Cambridge University Press, pp. 154-213, 234-272, 288-329, 344-387, year 1998.
Ashkenazi et al., U.S. Appl. No. 14/836,973 dated Aug. 27, 2015.
Bottomley et al., "A Generalized RAKE Receiver for Interference Suppression", IEEE Journal on Selected Areas in Communications, vol. 18, No. 8, pp. 1536-1545, Aug. 2000.
Lenardi et al., "SINR maximizing equalizer receiver for DS-CDMA", Proceedings of 10th European association for signal processing conference (EUSIPCO), 5 pages, Sep. 4-9, 2000.
Lenardi et al., "A Rake receiver with intracell interference cancellation for a DS-CDMA synchronous downlink with orthogonal codes", Proceedings of the IEEE 51st Vehicular Technology Conference, vol. 1, pp. 430-434, 5 pages, May 15-18, 2000.
Hooli et al., "Inter-path Interference Suppression in WCDMA Systems with Low Spreading Factors", IEEE 50th Vehicular Technology Conference, vol. 1, pp. 421-425, Sep. 19-22, 1999.
Hooli et al., "Performance Evaluation of Adaptive Chip-Level Channel Equalizers in WCDMA Downlink", Proceedings of the IEEE International Conference on Communications, vol. 6, pp. 1974-1979, Jun. 11-14, 2001.
AT&T et al., "Specification of enhanced performance requirements type 3i for HSDPA based on two-branch equaliser with interference interference cancellation", Change Request, 3GPP TSG-RAN 4, meeting # 45, 14 pages, Nov. 5-9, 2007.
3GPP ESTI 125.101, "3rd Generation Partnership Project; Universal Mobile Telecommunication System (UMTS); User Equipment (UE) radio transmission and reception (FDD) (Release 8)", V8.6.0 Technical Report, 216 pages, Mar. 2009.
Lohan et al., "Highly Efficient Techniques for Mitigating the Effects of Multipath Propagation in DS-CDMA Delay Estimation", IEEE Transactions on Wireless Communications, vol. 4, No. 1, pp. 149-162, Jan. 2005.
3GPP TS 25.214, "3rd Generation Partnership Project;Technical Specification Group Radio Access Network; Physical layer procedures (FDD)", version 11.9.0, Release 11, 128 pages, Jun. 2014.
International Application PCT/US2000/022504 Search report dated Nov. 30, 2000.
Hadinejad-Mahram, H, "On the Equivalence of Linear MMSE Chip-Level Equalizer and Generalized RAKE", IEEE Communications Letters, vol. 8, No. 1, pp. 7-8, Jan. 2004.
Frank et al., "Adaptive Interference Suppression for the Downlink of a Direct Sequence CDMA System with Long Spreading Sequences", Journal of VLSI signal processing systems for signal, image and video technology, vol. 30, Issue 1-3, pp. 273-291, year 2002.
Grant et al., "Generalized RAKE Receivers for MIMO Systems", Proceedings of the 58th IEEE Vehicular Technology Conference, vol. 1, pp. 424-428, Oct. 2003.
Kim et al., "Linear MMSE Space—Time Equalizer for MIMO Multicode CDMA Systems", IEEE transactions on Communications, vol. 54, No. 10, pp. 1710-1714, Oct. 2006.
Hadinejad-Mahram et al., "Performance Evaluation of Advanced Receivers for WCDMA Downlink Detection", Proceedings of the International Symposium on Wireless Personal Multimedia Communications, pp. 367-371, Oct. 2002.
Moshavi et al., U.S. Appl. No. 14/836,979 dated Aug. 27, 2015.

* cited by examiner

CHANNEL ESTIMATION BY SEARCHING OVER CHANNEL RESPONSE CANDIDATES HAVING DOMINANT COMPONENTS

CROSS-REFERENCE TO RELATED APPLICATIONS

This application claims the benefit of U.S. Provisional Patent Application 62/042,603, filed Aug. 27, 2014, whose disclosure is incorporated herein by reference.

FIELD OF THE DISCLOSURE

The present disclosure relates generally to communication systems, and particularly to methods and systems for channel estimation.

BACKGROUND

In various communication networks such as Code-Division Multiple Access (CDMA) networks, communication terminals receive signals over a multipath channel that varies over time. A receiver designed for such signals typically comprises an adaptive equalizer that attempts to cancel out distorting effects that the multipath channel may cause to the received signal. Such equalizers typically depend on reliable estimation of the underlying multipath channel.

The description above is presented as a general overview of related art in this field and should not be construed as an admission that any of the information it contains constitutes prior art against the present patent application.

SUMMARY

An embodiment that is described herein provides a method in a receiver including receiving a signal that traversed a multipath channel having a channel response, so as to produce a received sequence of samples that are indicative of the channel response. Using a predefined similarity measure, multiple metrics between the received sequence of samples and multiple respective candidate sequences of samples are calculated by the receiver. Each candidate sequence includes a combination of one or more dominant signal components having respective sample delays, and each candidate sequence corresponds to a channel multipath candidate that has one or more channel paths at the respective sample delays. The channel response is estimated by the receiver, by selecting the candidate sequence that best matches the received sequence, the selecting being based on the similarity measure.

In some embodiments, each of the signal multipath components includes multiple samples that conform to a predefined pules shape having a respective complex-valued amplitude, and estimating the channel response includes estimating the complex-valued amplitudes of the dominant signal components and assigning the complex-valued amplitudes to the respective channel paths of the channel multipath candidate. In other embodiments, the method includes setting the sample delays of the channel multipath candidate by selecting a combination of one or more sample delays from among multiple delay-combinations that each includes up to a maximal number of sample delays within a predefined delay window. In yet other embodiments, calculating the metrics includes selecting the multipath candidate based on a previously-selected multipath candidate.

In an embodiment, estimating the channel response includes identifying a region within the received sequence from which the channel response can be estimated. In another embodiment, the received sequence is modulated with a spreading sequence, and calculating the metrics includes producing multiple correlation outcomes by correlating the received sequence with multiple versions of a de-spreading sequence that de-modulates the spreading sequence, each version having a respective version delay, and calculating the metrics over a combination of the correlation outcomes. In yet another embodiment, calculating a given metric includes deriving, for a given candidate sequence, multiple sub-metrics corresponding to respective different segments of the received sequence, and combining the sub-metrics to produce the given metric.

In some embodiments, calculating the metrics includes evaluating, for a given candidate sequence, a sum of per-sample metrics applied to respective pairs of samples taken from the received sequence and from the given candidate sequence. In other embodiments, selecting the candidate sequence includes searching for an optimal channel candidate at a first rate and updating complex-valued amplitudes of the respective channel paths of the optimal multipath candidate at a second rate that is higher than the first rate. In yet other embodiments, the method includes applying to the received sequence an equalizer for equalizing the multipath channel and adapting the equalizer based on the estimated channel response.

There is additionally provided, in accordance with an embodiment that is described herein, apparatus including an interface and processing circuitry. The interface is configured to receive a signal that traversed a multipath channel having a channel response, so as to produce a received sequence of samples that are indicative of the channel response. The processing circuitry is configured to calculate, using a predefined similarity measure, multiple metrics between the received sequence of samples and multiple respective candidate sequences of samples, each candidate sequence includes a combination of one or more dominant signal components having respective sample delays, and each candidate sequence corresponds to a channel multipath candidate that has one or more channel paths at the respective sample delays, and, to estimate the channel response by selecting the candidate sequence that best matches the received sequence in accordance with the similarity measure. In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide improved methods and systems for estimating the channel response of a communication channel. The embodiments may be implemented in a receiver such as, for example, a Code-Division Multiple Access (CDMA) receiver. In some embodiments, the receiver comprises a channel estimator for estimating the response of the communication channel between the transmitter and the receiver.

A multipath channel comprises one or more channel paths that are also referred to herein as multipath channel components. In the receiver, each channel path is characterized by respective path delay and complex-valued path amplitude that are related to the propagation delay and attenuation that the path causes to the signal. The term "channel response" refers to the multipath channel including shaping that is created by pulse-shaping filters in the transmitter, receiver or both.

The objective of channel estimation, in an embodiment, is to estimate a sampled version of the channel response over a discrete delay grid. The samples of the estimated channel response are also referred to herein as "channel taps." The estimated channel response (i.e., the channel taps) can be used, for example, for signal equalization.

It is possible in principle to estimate the channel response by de-spreading the received signal, e.g., using a pilot de-spreading sequence, with different chip-resolution shift alignments that correspond to the different channel paths. In certain situations, however, the shaping filters in the transmitter and/or receiver cause the channel response to extend on the time axis far beyond the channel paths. Since the pulse-shape of the shaping filters typically decays outside some central region, long-delay channel taps (that are essential, e.g., for high performance equalization) are typically hidden below the noise level of the received signal, and are therefore difficult to estimate with sufficient accuracy.

In some disclosed embodiments, the channel estimator chooses, within the received signal, a region of channel response delay spread, referred to as a cluster, from which to estimate the channel response. Within the cluster, the channel estimator searches over a plurality of channel multipath candidates that each corresponds to a small number of dominant paths having path delays up to a maximal expected delay spread of the communication channel.

For each multipath candidate, the channel estimator estimates the complex amplitudes of the respective channel paths using Least-Squares (LS) methods, as will be described in detail below. The channel estimator selects an optimal multipath candidate for which the LS error is minimal. Since searching for the optimal multipath candidate over a large number of delay combinations is relatively complex, the channel estimator performs this task at a low rate, e.g., every 0.5 seconds, and updates the estimation of the complex amplitudes, based on the recently selected multipath candidate, at a higher rate, e.g., every 133.33 microseconds.

Concentrating on a small number of dominant paths per multipath candidate reduces the search complexity and is still sufficient for accurate channel response estimation. In an embodiment, during tracking, the channel estimator confines to multipath candidates that are close to the optimal multipath candidates recently selected, which makes the multipath candidate search even more efficient.

Each multipath candidate is associated with a respective candidate sequence that comprises a predefined pulse shape positioned at the respective path delays of the multipath candidate. In an embodiment, the predefined pulse shape conforms to a combined response of the pulse-shaping filters in the transmitter and receiver.

The channel estimator evaluates a similarity measure between the received signal and each candidate sequence by adjusting the complex amplitudes of the pulse shape at the respective path delays (i.e., estimating the channel paths) for achieving maximal similarity to the received signal. The channel estimator selects the optimal multipath candidate for which the respective candidate sequence best matches the received signal. In some embodiments, evaluating the similarity measure comprises calculating a Least Squares (LS) metric.

In some embodiments, the channel estimator estimates the channel taps within and outside the cluster by projecting the estimated channel paths onto the delay grid using the known pulse shape. The channel estimator re-estimates the complex amplitudes of the channel paths and the respective channel taps periodically, to track variations in the underlying communication channel. In one embodiment, the channel estimator searches for optimal multipath candidates at a given rate, and updates the complex amplitudes of the channel paths of this multipath candidate at a higher rate.

In the disclosed techniques, channel estimation is carried out at a resolution finer than the chip rate, and exploits knowledge of the pulse-shaping filters. As a result, the channel estimator achieves accurate estimates of the channel response even for long-delay taps.

Although the embodiments described herein refer mainly to reception and processing of Wideband CDMA (WCDMA) carriers, and are applicable to other forms of CDMA carriers such as CDMA2000. The disclosed techniques are additionally applicable to Long Term Evolution (LTE) or LTE-Advanced (LTE-A) carriers, and can be used also with various other types of communication links such as WI-FI links. The disclosed techniques are additionally applicable in detection systems such as sonar and radar systems, in which measuring the delay between the transmission of a reference signal and the detection of an echo signal retuned by a target should be performed at high accuracy.

In the description that follows we generally refer to a carrier that comprises a pilot channel and one or more data channels. The disclosed techniques, however, are also applicable to a carrier that, instead of or in addition to the data channels, comprises one or more suitable control channels.

In some of the embodiments described herein, the receiver operates in a High-Speed Downlink Packet Access (HS-DPA) mode, the data channel comprises a High-Speed Downlink Shared channel (HS-DSCH) that carries downlink data, and the pilot channel comprises a Primary Common Pilot Channel (P-CPICH) that is normally used by WCDMA User Equipment (UE) for synchronizing with the base station and for performing channel measurements. The HS-DSCH typically also carries a High Speed-Shared Control Channel (HS-SCCH). The disclosed techniques, however, are applicable to other configurations and modes and to other types of channels (e.g., twelve other types), as well.

In various forms of CDMA communication (and other suitable communication systems as well), the network typically assigns unique spreading sequences to different transmitted channels. The spreading sequences are typically defined at a common chip rate that is higher than the symbol rate of the channels. The transmitted channels are superimposed on one another and scrambled using a unique scrambling code, which the network assigns per transmitter, i.e., per Base Station (BS) or cell.

Figure 1:
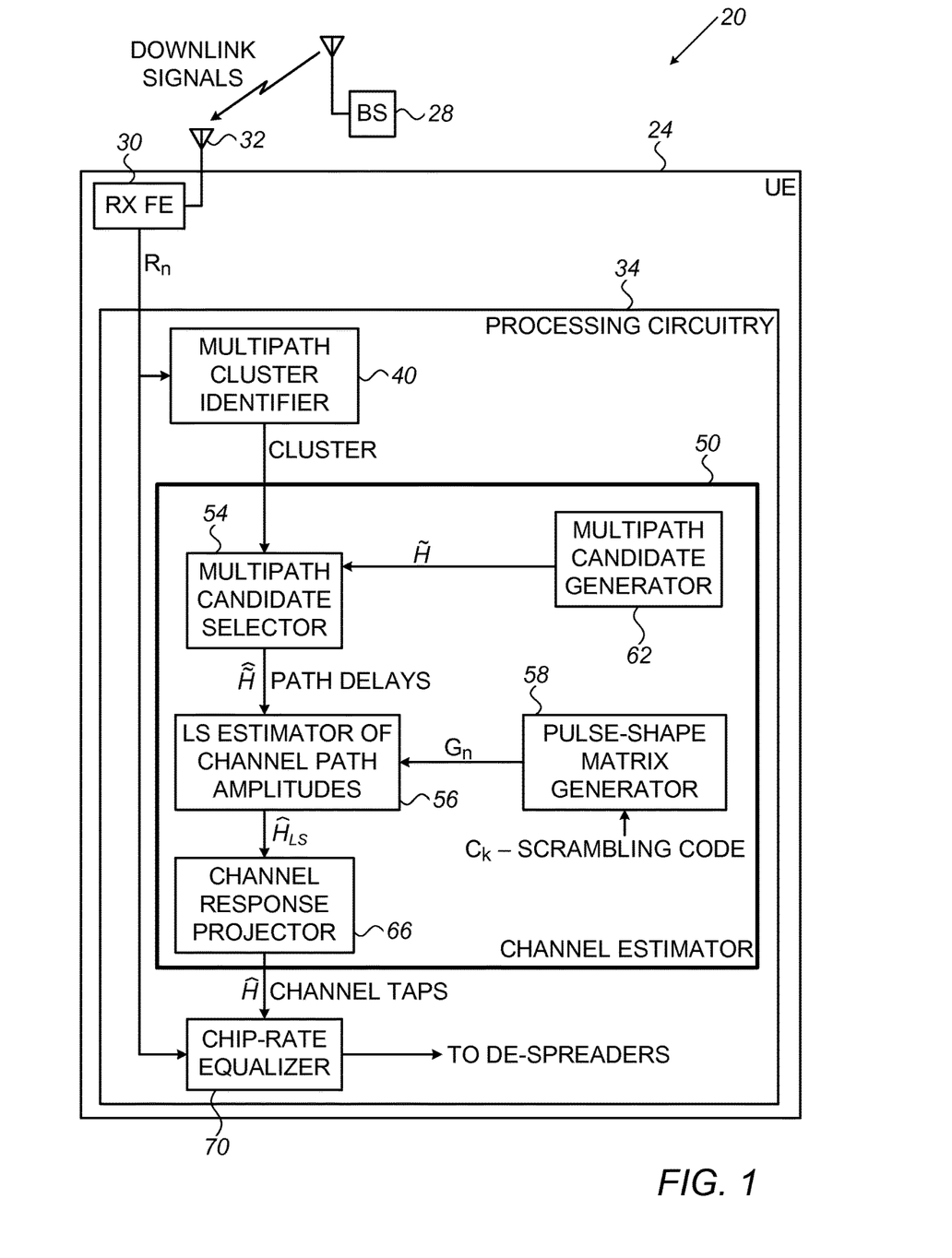
FIG. 1 is a block diagram that schematically illustrates a mobile communication terminal operating in a wireless Code-Division Multiple Access (CDMA) communication network, in accordance with an embodiment that is described herein.

FIG. 1 is a block diagram that schematically illustrates a mobile communication terminal 24 operating in a wireless CDMA communication network 20, in accordance with an embodiment that is described herein. In WCDMA, LTE and LTE-A, terminal 24 is also referred to as UE, and the two terms are used interchangeably herein.

The receiver section of terminal 24 comprises one or more receive antennas 32 for receiving downlink signals from a Base Station (BS) 28. Depending on the applicable standard, BS 28 is also referred to as a cell, NodeB or eNodeB. In the present example, the downlink signal comprises a WCDMA carrier that carries multiple WCDMA channels—typically a pilot channel and one or more data channels.

The pilot channel (e.g., P-CPICH) comprises pilot symbols that are known in advance to the receiver and are used, for example, for synchronization of the UE to the base station and for performing channel measurements by the UE. The data channel (e.g., HS-DSCH) carries user data symbols that are typically unknown at the receiver. In alternative embodiments, any other suitable CDMA or other carrier that includes a known pilot signal and possibly one or more unknown data channels can also be used.

Although the embodiments described herein refer mainly to P-CPICH and HS-DSCH, the disclosed techniques can be used with any other suitable type of pilot channel and data channel, respectively. In the context of the present patent application and in the claims, the term "pilot channel" refers to a channel on which a base station transmits symbols or other waveforms that are known in advance to the UEs, e.g., for enabling the UEs to synchronize to the base station and/or perform parameter measurements. The term "data channel" refers to a channel that carries user data, and possibly other data, between the base station and a UE. A pilot channel, by contrast, carries known pilot symbols but does not carry user data.

Although in the configuration of FIG. 1, the elements of UE 24 are mainly described with respect to WCDMA, similar configurations are also applicable to terminals that operate in other suitable communication networks, such as, for example, LTE networks.

A Receiver Front End (RX FE) 30 down-converts the received signals from Radio Frequency (RF) to baseband and typically applies other functions such as filtering, amplification, gain control and digitization. The digitized baseband signals are provided to processing circuitry 34. In the example of FIG. 1, RX FE outputs a baseband signal $R_n$ whose sample rate is higher than the chip rate. In the example of FIG. 1, processing circuitry 34 comprises a multipath cluster identifier 40, a channel estimator 50 and a chip-rate equalizer (CRE) 70 (also referred to as chip equalizer). FIG. 1 shows only the elements of circuitry 34 that are relevant to the disclosed estimation techniques, for the sake of clarity. The operations performed by the various elements of circuitry 34 are addressed in greater detail further below.

Chip equalizer 70 processes the baseband signal $R_n$ (e.g., at the chip rate) so as to reduce the distortion that the communication channel between the BS and the UE may have caused to the downlink WCDMA carrier. For example, in an urban environment, the downlink signal that is received at the UE may comprise a multipath signal created by reflections of the signal transmitted from the BS by one or more buildings or other obstacles, with or without a direct reception path. Chip equalizer 70 outputs a chip sequence of undistorted chips to one or more de-spreaders that each applies de-spreading using a unique spreading sequence which the network assigns to the UE.

Channel estimator 50 estimates the response $\hat{H}$ (i.e., the channel taps) of the communication channel between the BS and the UE. In the disclosed embodiments channel estimator 50 selects an optimal multipath candidate from a plurality of multipath candidates and adjusts the complex amplitudes of the respective channel paths based on a LS criterion, and is therefore also referred to herein as a LS channel estimator (LSCE).

Channel estimator 50 comprises a multipath candidate selector 54 that receives one or more multipath candidates from a multipath candidate generator 62, wherein each multipath candidate $\tilde{H}$ comprises one or more sample delays of the respective multipath candidate. Each multipath candidate is provided to a LS estimator 56 that also receives a generator matrix $G_n$ from a pulse-shape matrix generator 58.

Matrix generator 58 generates $G_n$ based on a predefined pulse shape that corresponds to a combined response of pulse-shaping filters at the transmitter and receiver. In some embodiments, the elements of matrix $G_n$ additionally depend on the scrambling sequence $C_k$.

For each multipath candidate, LS estimator 56 builds a respective candidate sequence by positioning the pulse shape at the respective path delays. LS estimator 56 measures the similarity between the received signal and each of the candidate sequences corresponding to the respective multipath candidates, and selects the optimal multipath candidate for which the respective candidate sequence best matches the received signal.

For a given multipath candidate, the respective candidate sequence comprises one or more signal components that each conforms to the pulse shape defined by the generator matrix and positioned at respective path delays of the multipath candidate. LS estimator 56 adjusts the complex amplitudes of the signal components to best match the received signal, e.g., to minimize the LS error between the received signal and the candidate sequence. The output of LS estimator 56 comprises optimal channel paths $\hat{H}_{LS}$ that were estimated based on the optimal multipath candidate.

A channel response projector 66 receives the optimal channel paths $\hat{H}_{LS}$ from LS estimator 56 and projects the optimal channel paths onto a delay grid, within and outside the cluster region, to produce the estimated channel response $\hat{H}$ (i.e., the channel taps) for the chip-rate equalizer. The delay grid used for projection can be the same grid used for selecting the optimal multipath candidate, or alternatively, a different grid.

In some embodiments, some or all of the elements of UE 24 are implemented in hardware, such as using one or more Radio Frequency Integrated Circuits (RFICs), Field-Programmable Gate Arrays (FPGAs) or Application-Specific Integrated Circuits (ASICs). In an alternative embodiment, certain UE elements, such as certain elements of processing circuitry 34, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The UE and processing circuitry configurations seen in FIG. 1 are example configurations, which are depicted solely for the sake of clarity. In alternative embodiments, any other suitable UE and processing circuitry configurations can be used. UE and processing circuitry elements that are not mandatory for understanding of the disclosed techniques have been omitted from the figure for the sake of clarity.

Figure 2A:
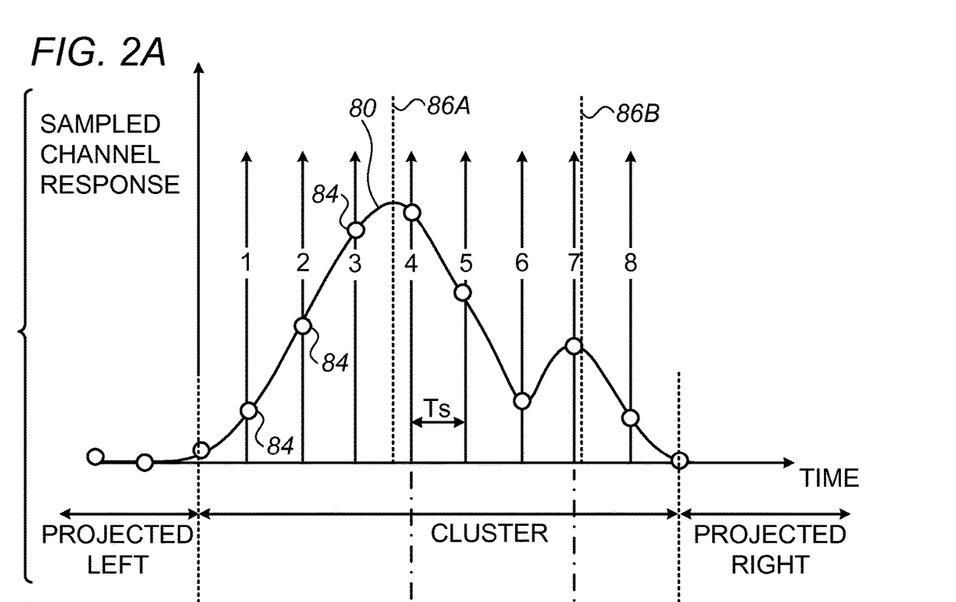
FIGS. 2A and 2B are diagrams that schematically illustrate a channel response that is sampled in accordance with a delay grid for the purpose of channel estimation, and optimal channel paths corresponding to the channel response, in accordance with embodiments that are described herein.
Figure 2B:
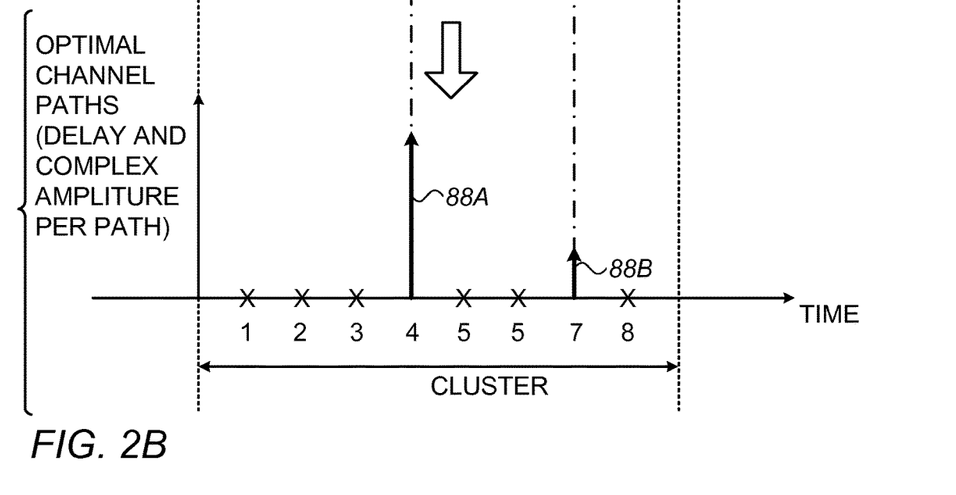

FIGS. 2A and 2B are diagrams that schematically illustrate a channel response 80 that is sampled in accordance with a delay grid for the purpose of channel estimation, and optimal channel paths 88 corresponding to the channel response, in accordance with embodiments that are described herein. In FIG. 2A, a region of the received signal that includes channel response 80 is sampled at a sample rate 1/Ts to produce samples 84. Channel response 80 comprises a transmitted chip centered about line 86A. The chip was transmitted using a suitable pulse-shaping modulation. In the present example, the pulse-shaping modulation corresponds to a raised-cosine shaping. Alternatively, any other suitable pulse-shaping modulation can also be used.

In the present example we assume that the received signal was transmitted over a multipath channel having a line-of-sight path and a reflection path. As a result, channel response 80 comprises the sum of the pulse shape positioned at line 86A and a weaker echo of the pulse shape centered about line 86B.

The region denoted CLUSTER in FIG. 2, is a region of the received signal in which the channel response is strong compared to the noise level of the signal. In an embodiment, the cluster region is identified, for example, by multipath cluster identifier 40 of FIG. 1. In some embodiments, the pulse shape of the received chips is known to the receiver, and is used for fine-resolution channel estimation and for projecting the estimated channel paths within and outside the cluster boundaries.

The vertical arrows 1 . . . 8 in FIG. 2A denote a delay grid used by multipath candidate generator 62 to position channel paths at selected path delays in searching for the optimal multipath candidate. In an embodiment, multipath candidate generator 62 generates combinations of path delays for a limited number of channel paths such as only one, two or three paths per multipath candidate. Limiting the number of combinations reduces the search complexity significantly with no, or only minor, performance degradation.

FIG. 2B depicts channel paths 88A and 88B that are optimal with respect to channel response 80 of FIG. 2A. As seen in the figure, path 88A at sample position 4 corresponds to the line-of-site reception, and path 88B at sample position 7 corresponds to the echo reception. The ratio between the absolute value of the amplitudes of the two paths is similar to the amplitude ratio between the line-of-site and the echo receptions.

Methods for selecting an optimal multipath candidate from among multiple multipath candidates, and for deriving optimal channel response estimation, are described in detail below.

Figure 3:
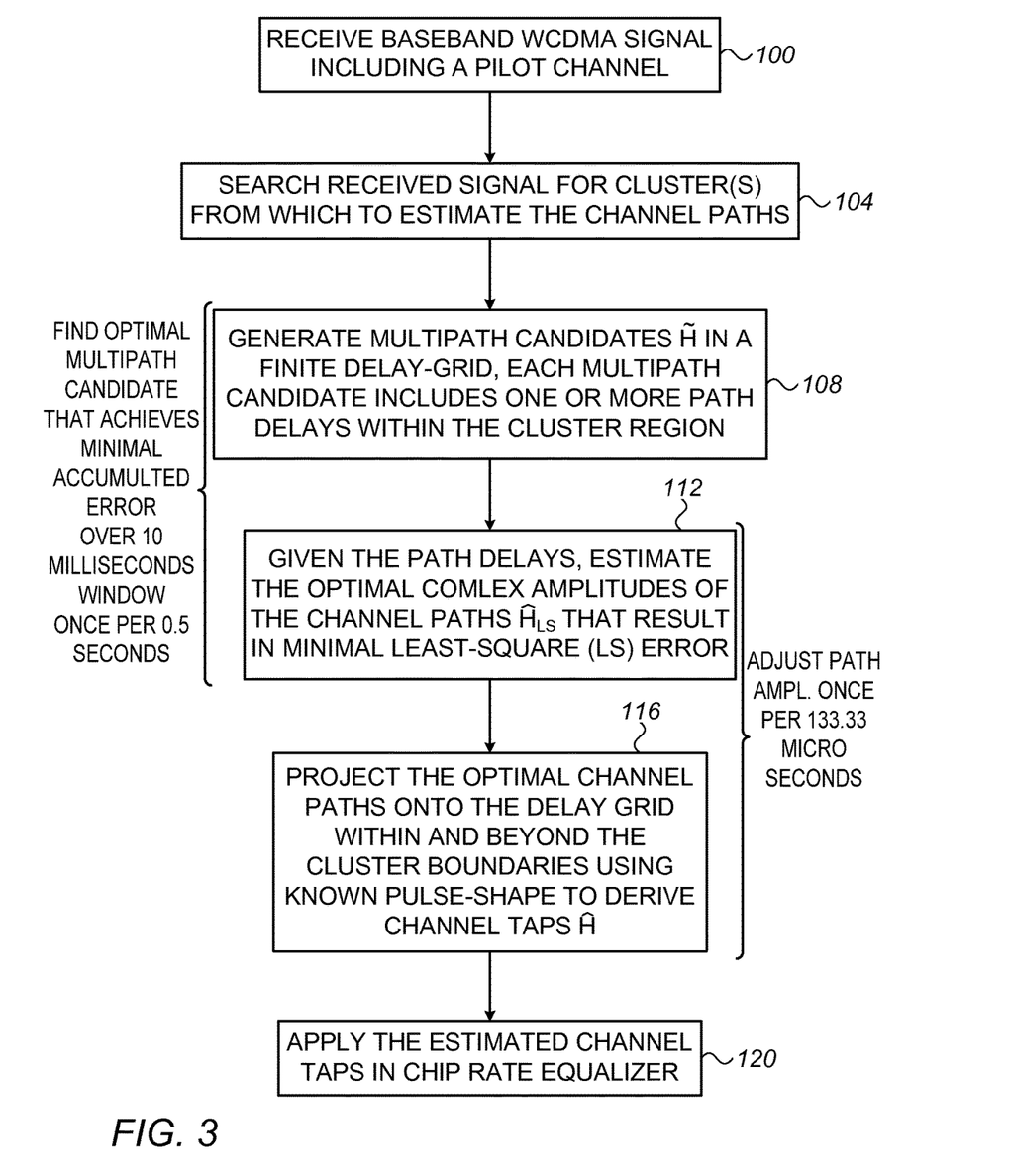
FIG. 3 is a flow chart that schematically illustrates a method for channel estimation, in accordance with an embodiment that is described herein.

FIG. 3 is a flow chart that schematically illustrates a method for channel estimation, in accordance with an embodiment that is described herein. The method is carried out, for example, by processing circuitry 34 of UE 24 in FIG. 1. The method begins with processing circuitry 34 receiving from RX FE 30 a baseband WCDMA signal that comprises a pilot channel, at a reception operation 100. In the present example, the received signal is sampled at a rate 1/Ts that is eight times higher than the chip rate 1/Tc, i.e., Tc=8·Ts.

At a cluster identification operation 104, multipath cluster identifier 40 identifies, within the signal received at operation 100, a cluster region from which the channel response can be estimated. In an embodiment, the cluster identifier locates the cluster by correlating the P-CPICH with the respective spreading pilot sequence at different chip alignments and identifies the strongest paths.

Let $R_n$ denote an observed part of the received signal that includes the identified cluster of operation 104. $R_n$ comprises a vector of N consecutive samples of the received signal.

$$R_n = [r(n-N+1), r(n-N+2), \ldots, r(n)]^T \qquad \text{Equation 1:}$$

The operator $[\ ]^T$ denotes a matrix transpose operator. In some embodiments, $R_n$ is modeled as a signal received over a multipath channel having a channel response $H_n$, and can be expressed in matrix form as follows:

$$R_n = G_n H_n + Z_n \qquad \text{Equation 2:}$$

In Equation 2, $H_n$ is a vector of length M corresponding to a multipath channel having a maximal delay spread of M samples, $G_n$ is an N by M generator matrix that will be described below, and $Z_n$ is a noise vector of length N.

$$H_n = [h_{M-1}(n), h_{M-2}(n), \ldots, h_0(n)]^T \qquad \text{Equation 3:}$$

$$Z_n = [\zeta(n-N+1), \zeta(n-N+2) \ldots, \zeta(n)]^T \qquad \text{Equation 4:}$$

The generator matrix $G_n$ has dimensions N×M and is given as:

$$G_n = \begin{bmatrix} g_n(0,0) & g_n(0,1) & \ldots & g_n(0, M-1) \\ g_n(1,0) & \ldots & \ldots & g_n(0, M-1) \\ \ldots & \ldots & \ldots & \ldots \\ g_n(N-1, 0) & \ldots & \ldots & g_n(N-1, M-1) \end{bmatrix} \qquad \text{Equation 5}$$

$G_n$ comprises a (N×M) matrix that is related to the underlying pulse-shape filter. Let RC(t) denote a response of a raised-cosine filter. RC(t) models the overall response of the pulse-shaping filters used at the transmitter and receiver.

Let $C_k$ denote the scrambling code used for scrambling the pilot channel, including the de-spreading sequence that is assigned to the pilot channel. An ideal undistorted version of the received pilot signal before sampling is therefore given by:

$$\text{ShapedScrCode}(t) = \sum_k C_k \cdot RC(t - kT_c) \qquad \text{Equation 6}$$

The elements of $G_n$ are derived by sampling ShapedScrCode(t) of Equation 6 at rate 1/Ts and arranging the samples in a matrix as depicted in Equations 7 and 8.

$$\text{ShapedScrCode}(l) = \text{ShapedScrCode}(lT_s) \qquad \text{Equation 7:}$$

$$g_n(i,j) = \text{ShapedScrCode}(n-N-M+i+j) \qquad \text{Equation 8:}$$

As noted above, $G_n$ represents an ideal undistorted version of the received pilot signal. In Equation 2 above, $G_n$ relates between this ideal version and the distorted version ($G_n \cdot H_n$) that is actually received over the multipath channel $H_n$. Each sample r(i) of the received signal in Equation 2 is calculated as a dot-product of the $i^{th}$ row of $G_n$ and the channel response vector $H_n$ plus a random noise sample. In the disclosed embodiments, a metric $E(R_n, G_n \cdot H_n)$ uses for measuring the similarity between the received signal $R_n$ and a candidate sequence $G_n \tilde{H}$ that is based on a respective multipath candidate $\tilde{H}$.

At a multipath candidate generation operation 108, multipath candidate generator 62 generates one or more multipath candidates. Each multipath candidate $\tilde{H}$ comprises one or more path delays for locating channel paths in the sample range 1 . . . M. For example, a single path candidate has a single path at a position 1 . . . M. A multipath candidate with two path delays may locate channel path pairs at positions [1,2], [1,3], . . . , [7,8], and a multipath candidate with three path delays may locate channel paths at positions [1,2,3], [1,2,4], . . . [7,8,9]. In some embodiments, the multipath candidate generator generates multipath candidates for all the delay combinations up to M path delays. In other embodiments, it is assumed that the number of dominant channel paths is smaller than M and delay combinations only up to, for example, three path delays, are considered.

At a LS estimation operation 112, multipath candidate selector 54 selects an optimal multipath candidate using LS estimator 56. Let $E_n$ denote a metric that measures the similarity between $R_n$ and $G_n \cdot H_n$. In the present example $E_n$ comprises a sum of squared difference (SSD) metric over N samples. In an example embodiment N=4096. Alternatively, any other suitable number of samples can also be used.

$$E_n = \|R_n - G_n H_n\|^2 = \sum_{k=n-N+1}^{n} \left| r(k) - \sum_{l=0}^{M-1} g_n(k,l) \cdot h_n(l) \right|^2 \quad \text{Equation 9}$$

For a multipath candidate $H_n = \tilde{H}$ that locates channel paths at given path delays, the multipath candidate selector first adjusts the complex amplitudes of the channel paths at the given delays so as to minimize $E_n$ in Equation 9.

$$\hat{H} = \underset{\tilde{H}}{\operatorname{argmin}} \|R_n - G_n \tilde{H}\|^2 \quad \text{Equation 10}$$

A solution to Equation 10 is given explicitly as:

$$\hat{H} = (G_n^+ G_n)^{-1} G_n^+ R_n \quad \text{Equation 11:}$$

In some embodiments, finding $\hat{H}$ using Equations 9-11 results in poor estimation because observing N received samples is insufficient. In such embodiment, $\hat{\tilde{H}}$ is found by minimizing a similarity metric $LSCEerror_n$ that sums L error elements as given in Equation 12 below. In other words, the metric in Equation 12 sums L individual error elements that are calculated over respective non-overlapping batches of N samples. In an embodiment, L=75, which is equivalent to a measurement window of ten milliseconds.

In alternative embodiments, other suitable segmentation schemes can also be used. In an embodiment, for reliable estimation, the channel estimator carries out the calculation in Equation 12 over L·N samples that span over a 10 ms window, although other suitable window lengths can also be used.

$$LSCEerror_n = \sum_{i=0}^{L-1} E_{n-iN} = \sum_{i=0}^{L-1} \|R_{n-iN} - G_{n-iN} H_{n-iN}\|^2 \quad \text{Equation 12}$$

Note that finding a multipath candidate for which the similarity metric in Equation 9 or 12 is minimized is carried out for each multipath candidate separately. Multipath candidate selector 54 repeats this stage for each of the multipath candidates provided by multipath candidate generator 62, and selects the optimal multipath candidate $\hat{\tilde{H}}$ that results in minimal LS error.

The channel estimator performs operations 108 and 112 for selecting the optimal multipath candidate periodically as a low rate task, e.g., at intervals in the range 100-500 milliseconds (i.e., rate of 2-10 Hz). For selecting the optimal candidate, the LS error is accumulated over a long window, e.g., 10 milliseconds. Alternatively, other suitable low rates and measurement windows can also be used. Given the path delays of the optimal multipath candidate, the channel estimator updates the complex amplitudes of the channel paths periodically at a higher rate, such as, for example, at a 7.5 KHZ rate in an embodiment. In this embodiment, the LS metric is evaluated over an interval of 2048 samples or 133.33 microseconds (1/7.5 Khz). The task of updating the complex amplitudes is thus performed at a rate of 7.5 KHz, and measures the LS error over the full cycle period of the 7.5 Khz rate. In alternative embodiments, other suitable rates for updating the complex amplitudes can also be used.

Since the locations of the channel paths are expected to vary at a much slower rate than their complex-valued amplitudes, the described updating scheme that updates the path delays and the amplitudes at different rates enables the channel estimator to track variations in the communication channel at acceptable complexity.

In some embodiments, the values of the complex amplitudes that are estimated at operation 112 are further smoothed using a suitable smoothing (e.g., low-pass) filter.

At a projection operation 116, channel response projector 66 uses the (possibly smoothed) estimated channel paths $\hat{H}_{LS}$ and the known pulse shape to estimate the channel response taps over a finite delay grid as required by chip-rate equalizer 70.

At an equalization operation 120, chip-rate equalizer 70 uses the channel taps for equalizing the received signal and outputs the equalized signal to one or more de-spreaders. The method then terminates.

The embodiments described above are given by way of example, and other suitable embodiments can also be used. For example, although the embodiments described above use a sum of square differences metric, other suitable metrics such as a sum of absolute differences can also be used.

In some embodiments, at operation 108, the number of path delay combinations used for generating the multipath candidates depends on whether the method is applied at acquisition or tracking phases. In an example embodiment, the number of delay combinations at the acquisition phase is large so as to capture the optimal multipath candidate accurately. On the other hand, during tracking phase, and assuming that the communication channel varies slowly relative to the channel estimation period, the method considers only combinations of path delays that are close to the path delays of recently selected optimal multipath candidates.

For example, assume that the most recent optimal multipath candidate locates first and second channel paths at positions 2 and 5, respectively. In this example, it may be sufficient to consider only multipath candidates with paths located at positions 1,2,3, for the first path and at positions 4,5,6 for the second path. Alternatively or additionally, multipath candidates that locate more than two channel paths in the range 1 . . . 6 can also be considered.

In the embodiments described above, the received signal is scrambled using the scrambling code $C_k$ and therefore the elements of generator matrix $G_n$ depend on $C_k$ as given, for example, in Equation 6 above. In alternative embodiments, the input signal is first processed using a comb of multiple fine-resolution correlators with different alignments of the pilot scrambling sequence, and the combined output of the comb correlators serves as the received signal for the channel estimator. In such embodiments the generator matrix $G_n$ is independent of the scrambling sequence $C_k$, and N can be significantly reduced, which simplifies the implementation.

In some embodiments, in addition to the scrambling sequence that the network assigned to the pilot channel per cell, the pilot channel may comprise a sequence of symbols that are known to the receiver and that are spread using a unique spreading code.

The description above mainly focuses on estimating the channel response based on a single cluster within the received signal. The disclosed techniques, however, are applicable to estimating the channel response based on two or more clusters simultaneously.

Although in the description above we mainly focus on channel estimation for the purposes of chip-rate equalization, the disclosed techniques are applicable for other purposes, such as, for example, in determining the positions of the multipath components at resolution finer than chip resolution.

Note that although in the disclosed embodiments the channel response estimation is used for a chip-rate equalizer, the disclosed techniques are also applicable to equalizers that operate at a rate higher than the chip rate.

Although the embodiments described herein mainly address WCDMA, the methods and systems described herein can also be used in other applications, such as in communication over CDMA, LTE or Wi-Fi, and in sonar and radar systems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
generating in a receiver one or more candidate sample-sequences, wherein each candidate sample-sequence corresponds to a respective channel-multipath candidate that comprises a respective combination of up to a predefined number of path delays, and wherein each candidate sample-sequence comprises one or more copies of a predefined sampled pulse-shape that are positioned at the path delays of the corresponding channel-multipath candidate;
receiving in the receiver a signal that traversed a multipath channel having a channel response, so as to produce a received sequence of samples that are indicative of the channel response;
estimating the channel response by the receiver, by selecting the candidate sample-sequence that best matches the received sequence.

2. The method according to claim 1, wherein estimating the channel response comprises estimating complex-valued amplitudes corresponding to the path delays, and assigning the estimated complex-valued amplitudes to the copies of the sampled pulse-shape at the respective path delays.

3. The method according to claim 1, and comprising setting the path delays of the channel-multipath candidate by selecting a combination of one or more path delays from among multiple delay-combinations that each includes up to a maximal number of path delays within a predefined delay window.

4. The method according to claim 1, wherein selecting the candidate sample-sequence comprises calculating, by the receiver, multiple metrics that evaluate similarity measures between the received sequence and the respective candidate sample sequences.

5. The method according to claim 4, wherein calculating the metrics comprises selecting the candidate sample-sequence based on a previously-selected candidate sample-sequence.

6. The method according to claim 4, wherein the received sequence is modulated with a spreading sequence, and wherein calculating the metrics comprises producing multiple correlation outcomes by correlating the received sequence with multiple versions of a de-spreading sequence that de-modulates the spreading sequence, each version having a respective version delay, and calculating the metrics over a combination of the correlation outcomes.

7. The method according to claim 4, wherein calculating a given metric comprises deriving, for a given candidate sample-sequence, multiple sub-metrics corresponding to respective different segments of the received sequence, and combining the sub-metrics to produce the given metric.

8. The method according to claim 1, wherein estimating the channel response comprises identifying a region within the received sequence from which the channel response can be estimated.

9. The method according to claim 1, wherein calculating the metrics comprises evaluating, for a given candidate sample-sequence, a sum of per-sample metrics applied to respective pairs of samples taken from the received sequence and from the given candidate sample-sequence.

10. The method according to claim 1, wherein selecting the candidate sample-sequence comprises searching for an optimal channel-multipath candidate at a first rate and updating complex-valued amplitudes of the copies of the sampled pulse shape at the respective path delays of the optimal channel-multipath candidate at a second rate that is higher than the first rate.

11. The method according to claim 1, and comprising applying to the received sequence an equalizer for equalizing the multipath channel and adapting the equalizer based on the estimated channel response.

12. An apparatus for channel estimation, comprising:
an interface, which is configured to receive a signal that traversed a multipath channel having a channel response, so as to produce a received sequence of samples that are indicative of the channel response; and
processing circuitry, which is configured to generate one or more candidate sample-sequences, wherein each candidate sample-sequence corresponds to a respective channel-multipath candidate that comprises a respective combination of up to a predefined number of path delays, and wherein each candidate sample-sequence comprises one or more copies of a predefined sampled pulse-shape that are positioned at the path delays of the corresponding channel-multipath candidate, and, to estimate the channel response by selecting the candidate sample-sequence that best matches the received sequence.

13. The apparatus according to claim 12, wherein the processing circuitry is configured to estimate complex-valued amplitudes corresponding to the path delays, and to assign the estimated complex-valued amplitudes to the copies of the sampled pulse-shape at the respective path delays.

14. The apparatus according to claim 12, wherein the processing circuitry is configured to set the path delays of the channel-multipath candidate by selecting a combination of one or more path delays from among multiple delay combinations that each includes up to a maximal number of path delays within a predefined delay window.

15. The apparatus according to claim 12, wherein processing circuitry is configured to select the candidate sample-sequence by calculating multiple metrics that evaluate similarity measures between the received sequence and the respective candidate sample sequences.

16. The apparatus according to claim 15, wherein the processing circuitry is configured to select the candidate sample-sequence based on a previously-selected candidate sample-sequence.

17. The apparatus according to claim 15, wherein the received sequence is modulated with a spreading sequence, and wherein the processing circuitry is configured to produce multiple correlation outcomes by correlating the received sequence with multiple versions of a de-spreading sequence that de-modulates the spreading sequence, each version having a respective version delay, and to calculate the metrics over a combination of the correlation outcomes.

18. The apparatus according to claim 12, wherein the processing circuitry is configured to identify a region within the received sequence from which the channel response can be estimated.

19. The apparatus according to claim 12, wherein the processing circuitry is configured to search for an optimal channel-multipath candidate at a first rate and to update complex-valued amplitudes of the copies of the sampled pule-shape at the respective channel path delays of the optimal channel-multipath candidate at a second rate that is higher than the first rate.

20. The apparatus according to claim 12, wherein the processing circuitry is configured to apply to the received sequence an equalizer for equalizing the multipath channel, and to adapt the equalizer based on the estimated channel response.

21. A mobile communication terminal comprising the apparatus of claim 12.

22. A chipset for processing signals in a mobile communication terminal, comprising the apparatus of claim 12.

* * * * *